A. SIMON.
ALTERNATING CURRENT MOTOR CONTROLLER FOR ELEVATORS.
APPLICATION FILED FEB. 21, 1907.

1,110,352.

Patented Sept. 15, 1914.
4 SHEETS—SHEET 3.

Fig. 4.

A. SIMON.
ALTERNATING CURRENT MOTOR CONTROLLER FOR ELEVATORS.
APPLICATION FILED FEB. 21, 1907.

1,110,352. Patented Sept. 15, 1914.
4 SHEETS—SHEET 4.

UNITED STATES PATENT OFFICE.

ARTHUR SIMON, OF MILWAUKEE, WISCONSIN, ASSIGNOR TO THE CUTLER-HAMMER MANUFACTURING COMPANY, OF MILWAUKEE, WISCONSIN, A CORPORATION OF WISCONSIN.

ALTERNATING-CURRENT-MOTOR CONTROLLER FOR ELEVATORS.

1,110,352.　　　　　Specification of Letters Patent.　　Patented Sept. 15, 1914.

Application filed February 21, 1907. Serial No. 358,665.

To all whom it may concern:

Be it known that I, ARTHUR SIMON, a subject of the Emperor of Germany, residing at Milwaukee, in the county of Milwaukee and State of Wisconsin, have invented new and useful Improvements in Alternating-Current-Motor Controllers for Elevators, of which the following is a full, clear, concise, and exact description, reference being had to the accompanying drawing, forming a part of this specification.

My invention relates to improvements in motor controllers, more particularly those adapted to control alternating current motors. The motors may, of course, be employed for various purposes, but this invention is especially useful in connection with motors employed to operate elevators.

My controller is designed more particularly for controlling alternating current motors adapted to be started as repulsion motors and then continue operation as induction motors. As an example of a motor of this type may be mentioned the one well known in the art as the Wagner motor. It is well known that repulsion motors have the advantage of being self starting but have the disadvantage of having their torque decrease as the speed increases and also of having the speed vary as the load varies. Single phase induction motors have the disadvantage of not being self starting but they have the advantage of being able to maintain an approximately constant speed irrespective of the load, in which particular they are like shunt wound direct current motors. The Wagner motor and others which operate on the same principle combine the two advantages of a repulsion motor and a single phase induction motor so that they are self starting and run at constant speed notwithstanding variations in load.

The object of my invention is to provide a controller which is especially adapted to control self starting, constant speed alternating current motors such, for example, as the Wagner motor just mentioned.

The particular motor which I have selected to illustrate the operation of my invention is provided with a commutator which is connected to the winding of the rotor. The brushes which bear upon said commutator are short circuited, preferably through suitable resistance. The motor is also provided with three slip rings or contact rings which are connected at three different points to the rotor or armature winding of the machine. There is a brush for each of these contact rings and said brushes are adapted to be disconnected, connected through resistance, or short circuited to thereby control the resistance in the armature winding. In starting the motor the current is first sent to the stator or field winding which causes the machine to start as a repulsion motor. After the motor attains sufficient speed, usually about half normal speed, it is caused to operate as an induction motor by connecting in the brushes which contact the above mentioned contact rings and gradually reducing the resistance as the motor approaches full normal speed. My controller is adapted to automatically connect the contact ring brushes at the proper time after the motor has been started as a repulsion motor and automatically decrease the resistance to bring the machine up to normal operative conditions. In the preferred form, here shown, my controller is adapted also to reverse the direction of operation of the motor.

Although the spirit of my invention may be embodied in various forms of mechanism, it is illustrated in an advantageous form in the mechanism shown in the accompanying drawings in which.

Similar numerals refer to similar parts throughout the several views.

The invention in the form here illustrated comprises a reversing switch and a controller switch which are connected together, preferably by mechanical means. The reversing switch is adapted to close a circuit through the stator winding to start the motor as a repulsion motor. The controller switch is adapted to control the resistance in the rotor circuit to thereby control the operation of the machine as an induction motor. The controller switch operates to first establish electrical connection between the contact ring brushes after the machine has reached approximately half speed and subsequently reduce the amount of interposed resistance until the rotor is finally short circuited. The motor then continues to act as an induction motor.

In the form here illustrated the controller is provided with a supporting frame 1, upon the top of which is mounted a reversing switch 2, of the drum type. The shaft 3 of the switch 2 is journaled in suitable bearings upon the frame 4 which is mounted upon said frame 1. Said frame 4 carries two insulated shells 5 upon which are mounted suitable contact segments 6. These segments are adapted to engage the contact fingers 7, which are suitably mounted upon said frame 4.

Two parallel panels or bases 8 and 9, consisting preferably of some insulating material, are attached to the framework, preferably by means of the brackets 10.

Figure 6:
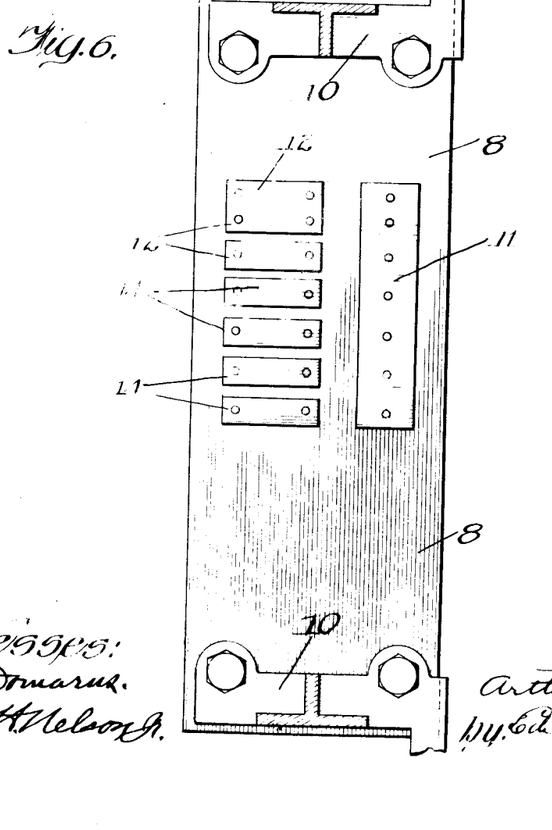

Mounted on the base 8 is a contact strip 11, and adjacent to it on the same base, a series of contacts 12 and 14 as best shown in Fig. 6. The contacts 12 and 14 are arranged in a row parallel to the strip 11. On base 9 is a contact strip 15, and in a row parallel to it on the same base are the contacts 16 and 18. The contacts 12 and 16 are "dead," that is, are not electrically connected to the rest of the apparatus and their purpose is merely to afford a surface over which the brushes 22 and 24 hereinafter described, may travel before coming to the contacts 14 and 18 respectively. The contacts 14 and 18 are connected through suitable rheostatic resistances 51 and 52 to the slip rings or contact rings of the rotor winding for controlling the operation of the machine as an induction motor as will be hereinafter explained.

Figure 1:
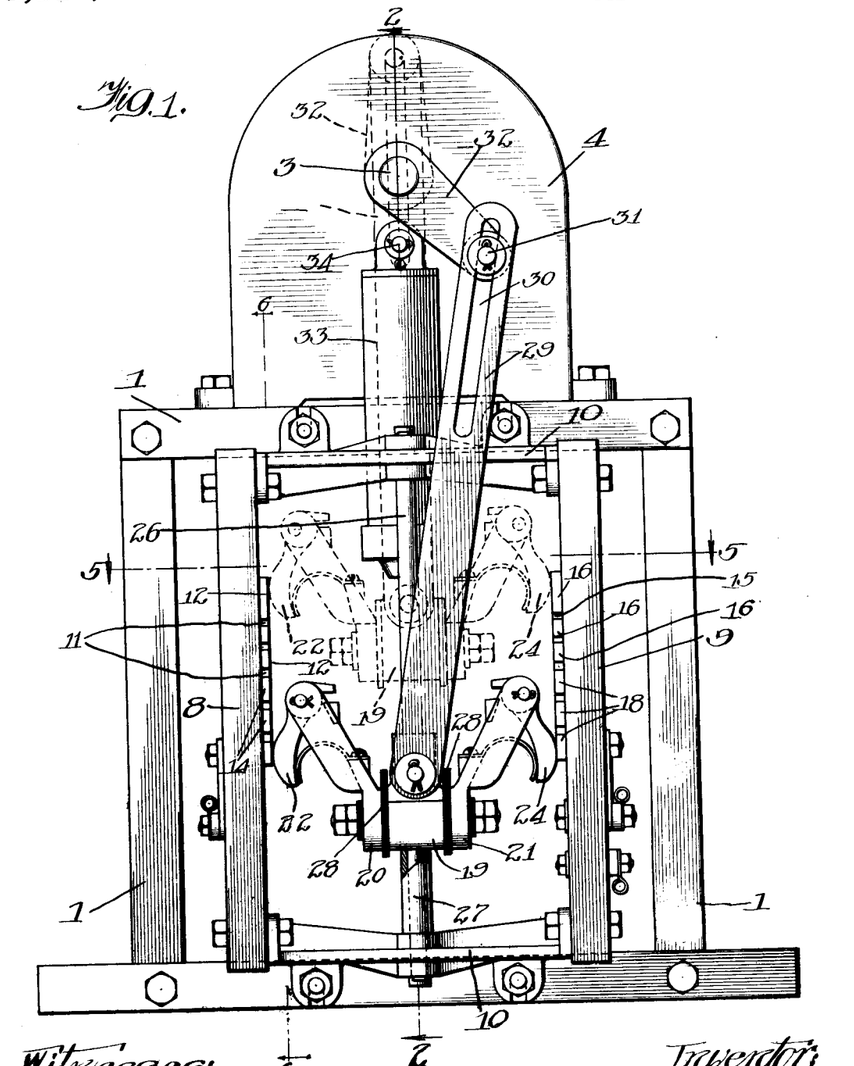
Figure 1 is a general front elevation.
Figures 2, 3:
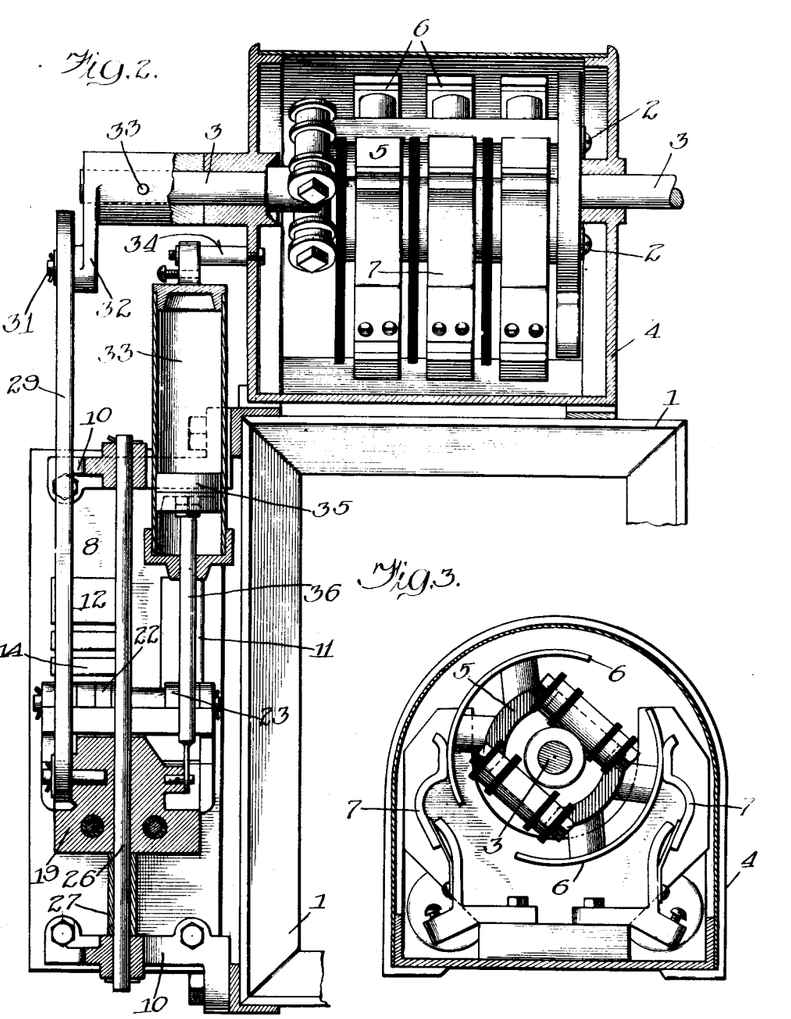
Fig. 2 is a sectional elevation taken chiefly on line 2—2 Fig. 1.
Fig. 3 is an end view of the reversing switch which in the present instance is a drum controller.

Located between said bases 8 and 9 is a brush carrier which comprises the sleeve 19, brackets 20 and 21, brushes 22 and 23 on bracket 20, and the brushes 24 and 25 on the bracket 21. In the best design the sleeve 19 and attached parts of the brush carrier move vertically, said sleeve being guided by the guide member 26 mounted in the brackets 10. The downward motion of said sleeve is limited by the stop 27 best shown in Fig. 1. The construction of the brush carrier and of the means for guiding and limiting its motion may be varied however without departing from the spirit of this invention broadly considered.

Figure 5:
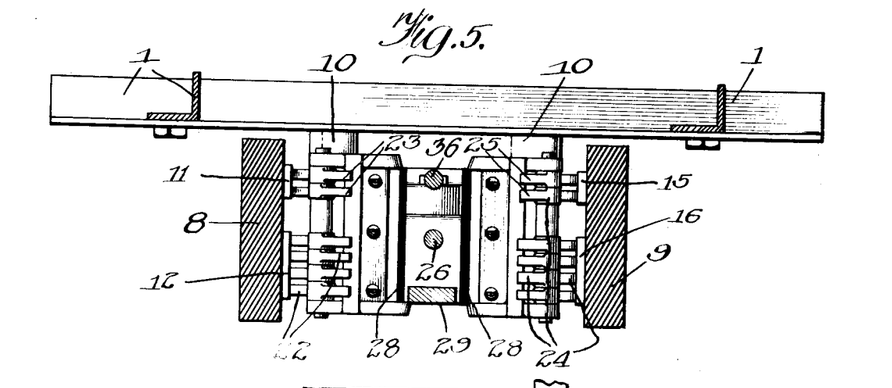
Fig. 5 is a sectional view taken on line 5—5, Fig. 1 and, Fig. 6 is a detail view of one of the bases which carry the contact strip and plates constituting part of the controller, the view being taken in the direction of the arrows at line 6—6, Fig. 1.

In the preferred form the brushes 22, 23, 24 and 25 each consists of a plurality of electrically connected fingers best shown in Fig. 5. A plurality of fingers is employed in each brush for the purpose of insuring good contact. Said brushes are insulated from the sleeve 19 in any suitable manner; for example by means of the insulating partitions 28 shown in Fig. 1. The parts are so arranged that as the brush carrier descends the brushes 23 and 25 will travel along the strips 11 and 15 respectively in electrical engagement therewith while the brush 22 will engage the plates 12 one after another, then the plates 14 one after another. In a similar manner the brush engages first the plate 16 then the plates 18 one after another which cuts in rheostatic resistance in the rotor circuit and then gradually cuts it out as hereinafter explained.

The brush carrier is connected to the reversing switch, preferably my mechanical means which include a lost motion device. In the preferred design here shown, the sleeve 19 and attached parts are operated by means of a link 29 which is pivoted to said sleeve and has a slot 30 through which passes a pin 31 secured to the crank 32. Crank 32 is rigidly secured by means of a pin 33 or otherwise to the shaft 3 hereinabove mentioned. By reason of the slot and pin connection between crank 32 and link 29 there is lost motion between the parts but the parts are so designed that when the crank 30 is upright in the position shown in dotted lines Fig. 1 the sleeve 19 will assume its highest position with the brushes 22 and 24 in contact with the plates 12 and 16 respectively. Crank 32 is fixed in such position upon shaft 3 that when said crank is upright the reversing switch will be in "off" position; that is to say the segments 6, 6, will be out of contact with the fingers 7, 7: but when said crank is rotated by the operator to extreme position in either direction from this upright or central position the brush carrier is released and permitted to descend to its lowest position which is indicated in full lines Fig. 1. On account of the lost motion between crank 32 and link 29 the rotation of crank 32 to "on" position does not force link 29 and the brush carrier downward but merely permits the latter to descend, in the present design under the action of gravity.

It is obvious that by providing suitable counter-weights the brushes may be designed to travel horizontally or in any other direction.

In order to delay the closing of the circuit which controls the operation of the motor as an induction motor until partial speed has been obtained, a time limiting device is employed to retard the descent of the brush carrier 19. An advantageous mechanism for thus retarding the descent of the brush carrier is here illustrated as a dash pot cylinder 33 mounted by means of a bracket 34 or otherwise to some portion of the framework of the machine. Said cylinder incloses a piston 35 connected by means of rod 36 to some portion of the sleeve 19. Said cylinder may be filled with oil or other liquid or air or other gas and by providing the piston 35 with any of the well known regulating means the rapidity of movement in the downward direction may be governed to suit the construction and operative conditions of the motor. A check valve or other means well known in the art should be provided in said piston to permit the same to be raised quickly and to offer as little resistance as possible to the operator who is manipulating the apparatus.

Figure 4:
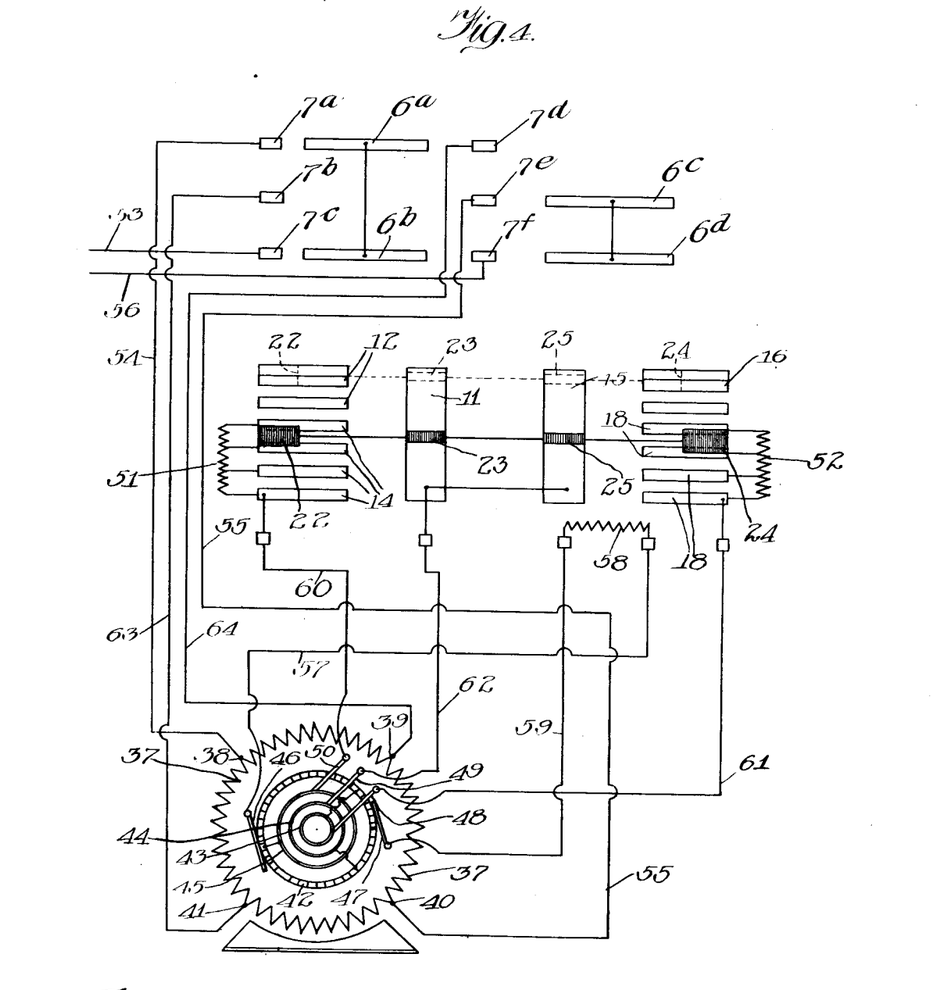
Fig. 4 is a diagram illustrating the theory of the invention as applied to a motor of the Wagner type hereinabove described.

To now consider the apparatus electrically, Fig. 4 illustrates the electrical relations of the parts of the controller, and the manner of connecting them to an alternating current motor having the characteristics of a repulsion and induction motor.

The contacts of the reversing switch and the controller are shown developed in a plane. The motor is provided with a stator winding 37, having four terminals 38, 39, 40 and 41. The rotor is provided with suitable windings suitably connected to a commutator 42, and three contact rings 43, 44 and 45. The commutator is engaged by brushes 46 and 47. The three contact rings 43, 44 and 45 are engaged by brushes 48, 49 and 50 respectively.

In order to distinguish from one another certain contacts of the reversing switch, to which the same reference numerals have hereinbefore been applied, I shall apply letters as exponents to said numerals.

As previously stated, the reversing switch contains a drum made up of two electrical insulated shells. One shell carries electrically connected segments $6^a$ and $6^b$. The other carries electrically connected segments $6^c$ and $6^d$. On one side of the drum are arranged fingers $7^a$, $7^b$, and $7^c$, and on the other side are arranged fingers $7^d$, $7^e$ and $7^f$.

When the parts of the reversing switch stand in the initial or "off" position, the contact segments are out of engagement with the contact fingers. If the reversing switch be turned in one direction, the segments $6^a$ and $6^b$ will engage the fingers $7^a$ and $7^c$ respectively, and the segments $6^c$ and $6^d$ will engage the fingers $7^e$ and $7^f$ respectively. If the reversing switch be turned in the reverse direction, the segments $6^a$ and $6^b$ will engage the fingers $7^d$ and $7^f$ respectively, and the segments $6^c$ and $6^d$ will engage the fingers $7^b$ and $7^c$ respectively.

I shall now refer particularly to the parts of the controller.

As previously stated, the contacts 12 and 16 are dead. The contacts 14 and 18 are connected to resistances 51 and 52 respectively. When the controller parts are in the initial or "off" position, the brushes 22, 23, 25 and 24 occupy the positions indicated in dotted lines, Figs. 1 and 4, the brushes 22 and 24 being at the top of the series of contacts 12 and 16 respectively, and the brushes 23 and 25 being at the top of the contact strips 11 and 15 respectively. The brushes 22, 23, 25 and 24 are electrically connected in series. The contact strips 11 and 15 are electrically connected.

I shall now describe the operation of the controller in starting the motor.

Assuming that the reversing switch is turned to start the motor in the forward direction, circuit will be closed from the main 53, through finger $7^c$, segment $6^b$, segment $6^a$, finger $7^a$, conductor 54, terminal 38, thence dividingly, through the stator winding 37, to the terminal 40; thence through conductor 55, finger $7^e$, segment $6^c$, segment $6^d$, finger $7^f$, to the main 56. The short circuit across the brushes 46 and 47 extends from the brush 46, through conductor 57, resistance 58, conductor 59, to the brush 47. The motor will thus be started as a repulsion motor.

As soon as the reversing switch has been closed, the brushes 22, 23, 25 and 24 will gradually descend, the brushes 22 and 24 first passing over the dead contacts 12 and 16. When the brushes 22 and 24 reach the contacts 14 and 18, circuit will first be closed from the brush 50, through conductor 60, resistance 51, contact 14, to brush 22, and also from brush 48, through conductor 61, resistance 52 and contacts 18, to brush 24. Moreover, a circuit will be closed from brush 49 through conductor 62, to contact strips 11 and 15, to brushes 23 and 25. It will thus be seen that the brushes 48, 49 and 50 are electrically connected through resistances 51 and 52. As the brushes 22 and 24 further descend, the resistances 51 and 52 will be removed from circuit step by step, until said resistances are entirely removed from the circuits connecting said brushes 48, 49 and 50. It will therefore be seen that after the motor has been operating for a predetermined period as a repulsion motor, it will then commence to operate as an induction motor, due to the brushes 48, 49 and 50 being electrically connected.

If the reversing switch be turned in the reverse direction from the "off" position, circuit will be closed from the main 53, through finger $7^c$, segments $6^d$ and $6^c$, finger $7^b$, conductor 63, to terminal 41; thence dividingly through the stator winding to terminal 39, and thence through conductor 64, finger $7^d$, segments $6^a$ and $6^b$ and finger $7^f$ to the main 56. The motor will thus be started in the opposite direction. The parts of the controller will then act in the same manner as heretofore described, to cause the motor to operate as an induction motor after it has been started and operated a predetermined time as a repulsion motor.

It will thus be seen that all the operator has to do in operating an apparatus embodying my invention is to throw the reversing switch in the proper direction. As soon as this has been done the motor will start, and after it has been running for a certain period as a repulsion motor the rotor circuit operating the motor as an induction motor will be closed through high resistance. This resistance will automatically be gradually cut out until the motor is running under normal conditions as an induction motor.

What I claim as new and desire to secure by Letters Patent, is:

1. In combination, a motor adapted to operate as a repulsion motor and as an induction motor and a controller for starting said motor as a repulsion motor and thereafter automatically establishing connections for causing the same to operate as an induction motor, said controller interrupting said latter connections in starting said motor.

2. In combination, a motor adapted to operate as a repulsion motor and as an induction motor, and a controller whereby said motor may be started as a repulsion motor and after the lapse of a predetermined interval of time be gradually and automatically caused to operate as an induction motor.

3. In combination, a motor adapted to operate as a repulsion motor and as an induction motor, and a controller mechanically independent of the motor to start the same as a repulsion motor and subsequently automatically cause the same to operate as an induction motor.

4. In combination, a motor adapted to operate as a repulsion motor and as an induction motor and a stationary and mechanically independent controller adapted to automatically change the circuit connections of the motor to cause the motor to operate as an induction motor after being started as a repulsion motor.

5. In combination, a motor adapted to operate as a repulsion motor and as an induction motor; a switch adapted to start the motor as a repulsion motor; a controller adapted to control the operation of the motor as an induction motor; and mechanically operating connections whereby said controller is automatically caused to operate the motor as an induction motor after said switch has been operated to start the motor as a repulsion motor.

6. In combination, a motor adapted to operate as a repulsion motor and as an induction motor; a switch adapted to start the motor as a repulsion motor; a controller adapted to control the operation of the motor as an induction motor; and connections including a timing device whereby said controller is adapted automatically to operate the motor as an induction motor after the lapse of a predetermined period.

7. An alternating current motor adapted to operate as a repulsion motor and as an induction motor; in combination with a switch controlling the circuit of the stator winding of the motor; a switch controlling the circuit of the rotor winding of the motor; means connecting said switches and adapted to cause the rotor switch to operate after the stator switch has operated, and means for retarding the operation of the rotor switch.

8. An alternating current motor adapted to operate as a repulsion motor and as an induction motor; in combination with a switch controlling the circuit of the stator winding of the motor; rheostatic resistance in circuit with the rotor winding of the motor; automatically movable brushes coöperating with said resistance to control the amount of resistance in the rotor circuit; connections between said switch and said brushes for causing said brushes to operate after said switch; and a timing device for retarding the rate of motion of said brushes.

9. An alternating current motor adapted to operate as a repulsion motor and as an induction motor; in combination with a switch controlling the circuit of the stator winding of the motor; rheostatic resistance in circuit with the rotor winding of the motor; automatically movable brushes coöperating with said resistance to control the amount of resistance in the rotor circuit; connections between said switch and said brushes for causing said brushes to operate after said switch; and a dash pot for controlling the time of operation of said brushes.

10. An alternating current motor having a commutator in circuit relation with the rotor and contact rings also in circuit relation with the rotor whereby said motor may be started as a repulsion motor and subsequently operated as an induction motor; in combination with a reversing switch in the stator circuit; an automatically operating controlling switch in circuit with said contact rings; connections between said switches adapted to release said controlling switch after the operation of said reversing switch, and a timing device for controlling the speed of operation of said controlling switch.

11. An alternating current motor having a commutator and contact rings and adapted to operate as a repulsion motor and as an induction motor; in combination with a reversing switch controlling the circuit of the stator winding of the motor for starting the motor as a repulsion motor; a controller adapted to control the circuit of the contact rings for operating the motor as an induction motor; said controller being self operating from "off" position to "on" position; means connecting said reversing switch to said controller and adapted to hold said controller in "off" position when said reversing switch is in "off" position and to release said controller to permit it to close its circuit after being released by said reversing switch; and means for delaying the action of said controller after it has been released by said reversing switch to thereby permit the starting and running of the motor as a repulsion motor for a limited period before the motor operates as an induction motor.

12. An alternating current motor having a commutator and contact rings and adapted to operate as a repulsion motor and as an induction motor; in combination with a reversing switch controlling the circuit of the stator winding of the motor for starting the motor as a repulsion motor; a controller adapted to control the circuit of the contact rings for operating the motor as an induction motor; said controller being self operating from "off" position to "on" position; means including two lost motion elements connecting said reversing switch to said controller and adapted to hold said controller in "off" position when said reversing switch is in "off" position and to release said controller to permit it to close its circuit after being released by said reversing switch; and means for delaying the action of said controller after it has been released by said reversing switch to thereby permit the starting and running of the motor as a repulsion motor for a limited period before the motor operates as an induction motor.

13. In combination, an alternating current motor having a commutator and contact rings, a reversing switch controlling the circuit of the stator winding of the motor, a slotted link connecting the reversing switch to the controller, a time limiting device for retarding the action of the controller to permit of the starting of the motor as a repulsion motor upon the actuation of the reversing switch, and after the lapse of a predetermined period to cause the operation of the motor as an induction motor.

14. In combination with a motor adapted to be operated both as a repulsion motor and an induction motor; a switch adapted to control the stator winding of the motor, said switch including a frame and a controlling shaft mounted therein; a controller for controlling the rotor winding circuit by which the motor is operated as an induction motor, said controller including stationary contacts and movable brushes adapted to engage them; a lost motion device connecting said brushes with said shaft and adapted to hold said brushes in "off" position when said switch is in "off" position; and means for governing the movement of said brushes when the same are released by said lost motion device.

15. In combination with a motor adapted to be operated both as a repulsion motor and an induction motor; a switch adapted to control the stator winding of the motor, said switch including a frame and a controlling shaft mounted therein; a controller for controlling the rotor winding circuit by which the motor is operated as an induction motor, said controller including stationary contacts and movable brushes adapted to engage them, said brushes being weighted whereby they are self movable from "off" to "on" position; a lost motion device connecting said brushes with said shaft and adapted to hold said brushes in "off" position when said switch is in "off" position; and means for governing the movement of said brushes when the same are released by said lost motion device.

16. In combination with a motor adapted to be operated both as a repulsion motor and an induction motor; a switch adapted to control the stator winding of the motor, said switch including a frame and a controlling shaft mounted therein; a controller for controlling the rotor winding circuit by which the motor is operated as an induction motor, said controller including stationary contacts and movable brushes adapted to engage them, said brushes being weighted whereby they are self movable from "off" to "on" position; a lost motion device including a pin and slotted link connecting said brushes with said shaft and adapted to hold said brushes in "off" position when said switch is in "off" position; and means for governing the movement of said brushes when the same are released by said lost motion device.

17. In combination with a motor adapted to be operated as a repulsion motor and an induction motor; a stationary frame; a drum reversing switch adapted to control the stator winding of the motor, said switch including a drum shaft mounted in said frame and a crank secured to said shaft; a controller adapted to control the rotor winding for controlling the motor as an induction motor, said controller including oppositely disposed bases mounted on said frame, a series of contacts on said bases, and brushes adapted to engage said contacts; a lost motion device connecting said crank and said brushes and adapted to release said brushes when the drum switch is turned to "on" position; and a dash pot for retarding the movement of said brushes.

18. In a controller for alternating current motors, in combination, a drum reversing switch for the stator of the motor, a controller, circuit connections established by said controller for causing the motor to operate as an induction motor after starting as a repulsion motor, lost motion connections between said reversing switch and said controller whereby the latter is held in "off" position when the former is in "off" position, said controller being released and being self-operable upon movement of said reversing switch to "on" position, and means for retarding the movement of said controller when released.

19. The combination with a motor having means by which it may be operated either as a repulsion motor or as an induction motor, of a controller adapted to operate to start the motor solely as a repulsion motor and then after the motor reaches partial speed gradually and automatically cause said motor to operate as an induction motor.

20. The combination with a motor having means by which it may be operated as a repulsion motor, or as an induction motor, of a switch by means of which the motor may be started as a repulsion motor, controlling mechanism by means of which the motor will be caused to operate as an induction motor after it attains a partial speed, and means mechanically connecting said switch and said controlling mechanism.

21. In combination, a motor having means by which it may be operated either as a repulsion motor or as an induction motor, a switch by means of which said motor may be started solely as a repulsion motor, a controller adapted to cause said motor to operate as an induction motor after it has attained partial speed, and means permitting a predetermined time to elapse between the time the motor begins to operate as a repulsion motor and the time when it begins to operate as an induction motor.

22. The combination with a motor having means by which it may be operated either as a repulsion motor or as an induction motor, of a switch by means of which the motor may be caused to operate as a repulsion motor, a controller by means of which the motor may be caused to operate as an induction motor comprising a series of contact plates and a brush carrier, a mechanical connection between the switch and the controller permitting a predetermined time to elapse between the operation of said switch and said controller and a time limiting device controlling the action of said brush carrier.

23. In combination, a motor having means by which it may be operated either as a repulsion motor or as an induction motor, a switch by means of which the motor may be caused to operate as a repulsion motor, a controller by means of which the motor may be caused to operate as an induction motor, a mechanical connection between said switch and said controller for permitting a definite sequence of operation of said switch and controller, and a time limiting device for controlling the action of said controller.

24. In combination, a motor having means by which it may be operated either as a repulsion motor or as an induction motor, a reversing switch by means of which the motor may be started as a repulsion motor, a controller by means of which the motor may be caused to operate as an induction motor after it has been started as a repulsion motor, mechanical means connecting the reversing switch and controller for causing the said controller and reversing switch to operate in definite sequence, and means for regulating the time between the operation of the reversing switch and the controller.

25. In combination, a motor having means by which it may be operated as a repulsion motor or as an induction motor, a reversing switch for causing the motor to be started as a repulsion motor, a controller by means of which the motor may be operated as an induction motor after it has been started as a repulsion motor, said controller comprising a series of contacts and a member adapted to move thereover, a mechanical connection between the reversing switch and said member by means of which said member is released, when the reversing switch is operated, and a dash-pot for retarding the movement of said member.

26. In combination with a motor having means whereby the same may be operated either as an induction motor or as a repulsion motor, a reversing switch for causing the motor to start as a repulsion motor, a controller for causing the motor to operate as an induction motor after the same has attained a predetermined speed as a repulsion motor, means connecting the reversing switch and controller permitting a definite sequence in the operation of the switch and controller and means for retarding the operation of the controller to permit of the elapse of a predetermined interval between the operation of the switch and controller.

27. Apparatus for controlling alternating current motors, comprising a reversing switch controlling the stator winding of the motor, a switch controlling the rotor circuit of the motor, operating connections between said switches, a time limiting device adapted to influence the operation of said controller switch and connections controlled by said apparatus for causing the motor to start as a repulsion motor and thereafter operate as an induction motor.

28. Apparatus for controlling a motor adapted to operate as a repulsion motor and as an induction motor, a control switch for the primary circuit of the motor, a control switch for the secondary circuit of the motor, said switches being interlocked to operate in a definite sequence, connections adapted to be established by said second-mentioned switch for causing the motor to operate as an induction motor, and means governing the operation of said second mentioned switch to render the same ineffective to establish said connections for a definite time after the operation of said first-mentioned switch to start the motor as a repulsion motor.

29. A controller for a motor adapted to operate as a repulsion motor and as an induction motor, comprising a switch for starting the motor as a repulsion motor, and means mechanically associated with said switch for automatically causing the motor to operate as an induction motor a predetermined interval of time after the switch has been operated.

30. Apparatus for controlling a motor adapted to operate as a repulsion motor and as an induction motor, in combination, a switch for controlling the circuit of the stator winding of the motor, a switch for controlling the circuit of the rotor winding of the motor, means connecting said switches for causing said rotor switch to operate after the stator switch has operated, and means to insure the lapse of a predetermined interval of time after the stator switch has operated before the rotor switch operates.

31. Apparatus for controlling a motor adapted to operate as a repulsion motor and an induction motor, in combination, a switch for controlling the circuit of the stator winding of the motor, rheostatic resistance in circuit with the rotor winding of the motor, movable brushes for gradually and automatically varying the resistance in circuit, means connecting said switch and said brushes for causing said brushes to operate after said switch, and a timing device for retarding the rate of motion of said brushes.

32. Apparatus for controlling a motor adapted to operate as a repulsion motor and as an induction motor in combination, a rotatable switch having its axis arranged horizontally, a crank connected to said switch, a vertically movable contact member, a link connecting said contact member to said crank, a pair of parallel bases on opposite sides of said contact member, and carrying contacts to be engaged by said contact member in its vertical movement, circuit connections whereby said switch is adapted to start the motor as a repulsion motor, and circuit connections whereby said contact member and its coöperating stationary contacts are adapted to cause the motor to afterwards operate as an induction motor.

33. In a motor controller, a rotatable reversing switch having its axis arranged horizontally, a crank connected to said switch, two vertical bases arranged parallel to each other and below said crank, a plurality of contacts arranged on said bases, supporting members for said bases, a vertically extending guiding member secured to said supporting members, a contact carrying member adapted to move on said guiding member, a dash-pot arranged above and connected to said contact carrying member for timing the movement thereof, a plurality of contact fingers carried by and insulated from said contact carrying member, said fingers being arranged to engage the contacts on the bases, and a link connecting said contact carrying member to said crank.

In witness whereof, I have hereunto subscribed my name in the presence of two witnesses.

ARTHUR SIMON.

Witnesses:
R. E. Ludwick,
R. C. Fenner.